United States Patent
Meyerkord et al.

(10) Patent No.: US 6,368,077 B1
(45) Date of Patent: Apr. 9, 2002

(54) TURBOCHARGER SHAFT DUAL PHASE SEAL

(75) Inventors: Daniel J Meyerkord, Burr Ridge; Gary R Svihla, Clarendon Hills, both of IL (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/567,877

(22) Filed: May 10, 2000

(51) Int. Cl.$^7$ ................................................ F04B 17/00
(52) U.S. Cl. .................... 417/407; 415/170.1; 277/320
(58) Field of Search ...................... 417/407; 415/172.1, 415/174.5, 230, 170.1, 111, 112; 277/431, 347, 430, 320, 348, 387, 351

(56) References Cited

U.S. PATENT DOCUMENTS

| | | | | |
|---|---|---|---|---|
| 3,874,677 A | * | 4/1975 | Ludwig et al. | 277/27 |
| 4,207,035 A | * | 6/1980 | Perr et al. | 417/407 |
| 4,257,617 A | * | 3/1981 | Hill | 277/27 |
| 4,472,107 A | * | 9/1984 | Chang et al. | 415/170.1 |
| 4,673,332 A | * | 6/1987 | Smith | 415/170.1 |
| 5,074,567 A | * | 12/1991 | Orlowski | 277/25 |
| 6,039,535 A | * | 3/2000 | Kobayashi et al. | 415/172.1 |
| 6,102,577 A | * | 8/2000 | Tremaine | 415/112 |

FOREIGN PATENT DOCUMENTS

| | | | | |
|---|---|---|---|---|
| JP | 362251575 A | * | 11/1987 | 277/320 |

* cited by examiner

Primary Examiner—Thomas Denion
Assistant Examiner—Thai-Ba Trieu
(74) Attorney, Agent, or Firm—Cary W. Brooks

(57) ABSTRACT

A seal system for a four cycle engine turbocharger includes dual phase seals for limiting leakage from lubricated rotor support bearings to a turbine and/or compressor wheel of a rotor operational over an extended speed range. The dual phase seal combines features of a labyrinth seal, effective in a higher portion of the turbocharger rotor speed range, with features of an auger seal, found to be effective in a lower portion of the rotor speed range. The dual phase seals each include an outer cylinder on the rotor between a bearing and an associated wheel, an inner cylinder carried by a rotor support and surrounding the outer cylinder with close clearance, auger seal grooving formed in one of the cylinders on a portion thereof toward the bearing, labyrinth seal grooving formed in one of the cylinders on a portion thereof toward the wheel, and a pressure air supply to the labyrinth seal at a pressure which is reduced at rotor speeds in a lower portion of the speed range. Air pressure is supplied from an output of the compressor wheel to the labyrinth seal grooving for both the turbine and compressor ends of the rotor shaft. The dual phase seals operate without wear and provide cost effective and dependable rotor sealing at all rotor speeds without fragile or wearing parts, failure of which could cause damage to other components.

10 Claims, 3 Drawing Sheets

# TURBOCHARGER SHAFT DUAL PHASE SEAL

TECHNICAL FIELD

This invention relates to compressor and turbine wheel shaft seals, particularly for use in engine turbochargers and the like. More particularly, the invention relates to a shaft seal system especially applicable to four cycle engine turbochargers.

BACKGROUND OF THE INVENTION

Well known turbocharged two cycle diesel engines have been used in railway locomotives and other applications for many years. Because two cycle engines are not self scavenged, a turbocharger has been developed which uses a mechanical drive train to drive a turbine/compressor rotor to provide adequate scavenging and charging air pressure at engine idle and in the lower speed and power settings of the associated engine. The turbocharger is provided with turbine and compressor rotor shaft seals employing labyrinth seal grooves fed with pressure air from the output of the compressor wheel. The developed labyrinth seal system has proved to be extremely reliable and functionally effective, as well as cost effective for use in two cycle engine applications. The labyrinth seal grooves are preferably formed in an inner cylinder surrounding the rotor shaft, although they could alternatively be formed in an outer cylinder rotating with the shaft.

In designing a turbocharger for a four cycle diesel locomotive engine, the labyrinth seal system used in the two cycle engine turbocharger has been found to be less effective. This is because, at idle and in operation at light loads, the four cycle turbocharger does not provide sufficient air pressure boost to supply adequate air pressure to the labyrinth seals. A suitable cost effective and reliable seal system was therefore desired to effectively limit oil leakage under the full operating range of the four cycle engine and turbocharger.

SUMMARY OF THE INVENTION

The present invention provides an improved seal system including a dual phase seal for limiting leakage from lubricated rotor support bearings to a turbine and/or compressor wheel of a rotor operational over an extended speed range. The dual phase seal combines features of the previously developed labyrinth seal, effective in a higher portion of the turbocharger rotor speed range, with added features of a known auger seal, found to be effective in a lower portion of the rotor speed range.

In general, the dual phase seal includes an outer cylinder on the rotor between a bearing and an associated wheel, an inner cylinder carried by a rotor support and surrounding the outer cylinder with close clearance, auger seal grooving formed in one of the cylinders on a portion thereof toward the as bearing, labyrinth seal grooving formed in one of the cylinders on a portion thereof toward the wheel, and a pressure air supply to the labyrinth seal at a pressure which is reduced at rotor speeds in a lower portion of the speed range.

The seal system for a turbocharger includes a pressure air supply from an output of the compressor wheel to the labyrinth seal grooving of bearing seals for both the turbine and compressor ends of the rotor shaft. The auger groove portions of the dual phase seals provide effective sealing at lower rotor speeds but lose effectiveness at higher speeds. The labyrinth groove portions of the seals provide effective sealing at the higher rotor speeds where the auger seal portions are less effective.

These and other features and advantages of the invention will be more fully understood from the following description of certain specific embodiments of the invention taken together with the accompanying drawings.

DESCRIPTION OF THE PREFERRED EMBODIMENT

Figure 1:
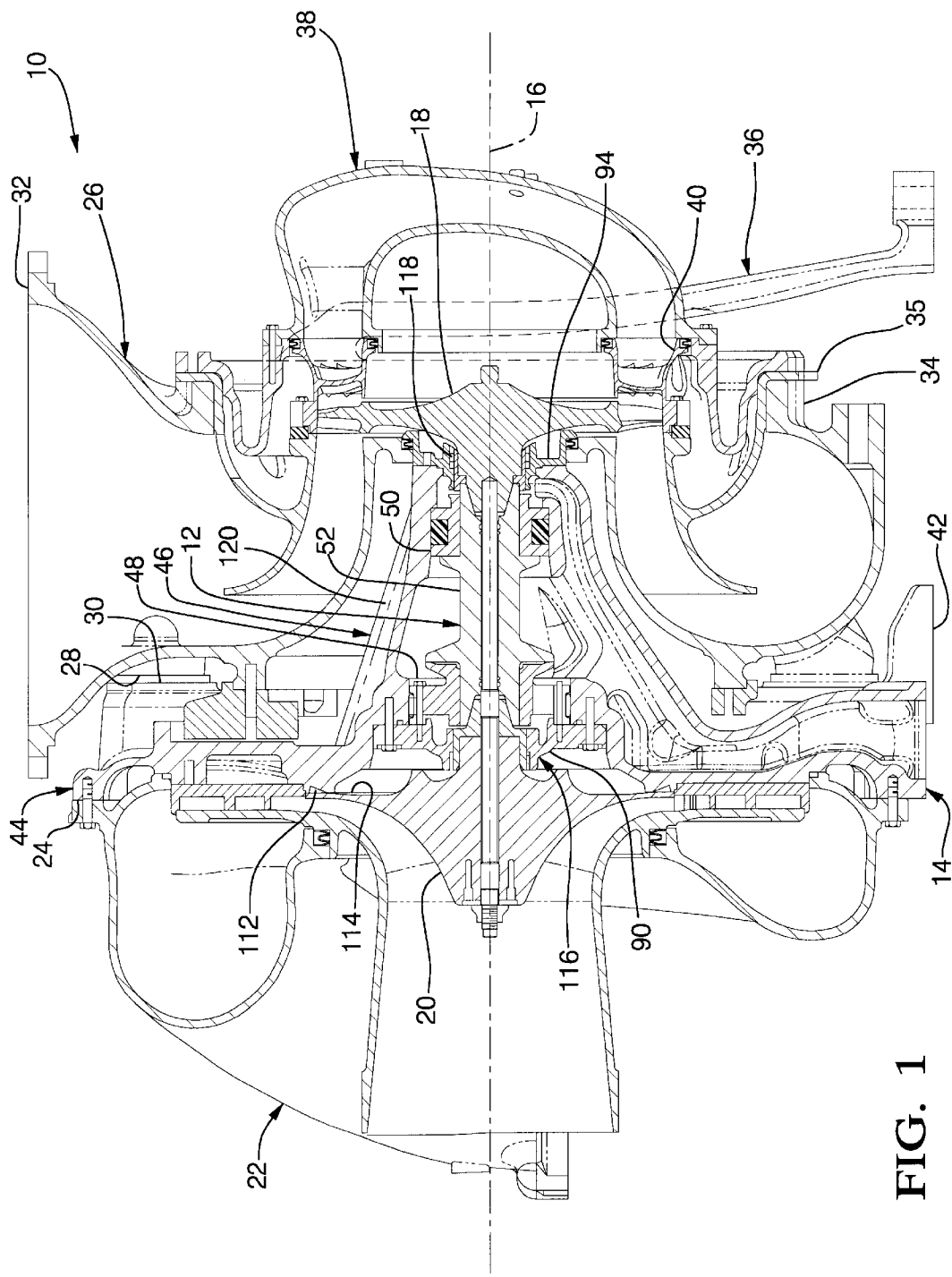
FIG. 1 is a cross-sectional view of an engine turbocharger having dual phase rotor seals in accordance with the invention.

Referring now to the drawings in detail, numeral 10 generally indicates an exhaust driven turbocharger for an engine, such as a diesel engine intended for use in railway locomotives or other applications of medium speed diesel engines. Turbocharger 10 includes a rotor 12 carried by a rotor support 14 for rotation on a longitudinal axis 16 and including a turbine wheel 18 and a compressor wheel 20. The compressor wheel is enclosed by a compressor housing assembly 22 including components which are supported on an axially facing first side 24 of the rotor support 14. An exhaust duct 26 has a compressor end 28 that is mounted on a second side 30 of the rotor support 14 spaced axially from the first side 24.

The exhaust duct 26 is physically positioned between the rotor support 14 and the turbine wheel 18 to receive exhaust gases passing through the turbine wheel and carry them to an exhaust outlet 32. A turbine end 34 of the exhaust duct 26 and an associated nozzle retainer assembly 35 are separately supported by an exhaust duct support 36 that is connected with the exhaust duct 26 at the turbine end 34. The exhaust duct support 36 also supports a turbine inlet scroll 38 which receives exhaust gas from the associated engine and directs it through a nozzle ring 40 to the turbine wheel 18 for transferring energy to drive the turbocharger compressor wheel 20.

The rotor support 14 includes a pair of laterally spaced mounting feet 42 which are rigidly connected to an upstanding mounting portion 44 of the rotor support 14 and are adapted to be mounted on a rigid base, not shown. The rotor support 14 further includes a tapering rotor support portion 46 having bearings 48, 50 that rotatably support the rotor 12. Bearing 48 is a combination sleeve and thrust bearing while bearing 50 is primarily a sleeve bearing.

Figure 2:
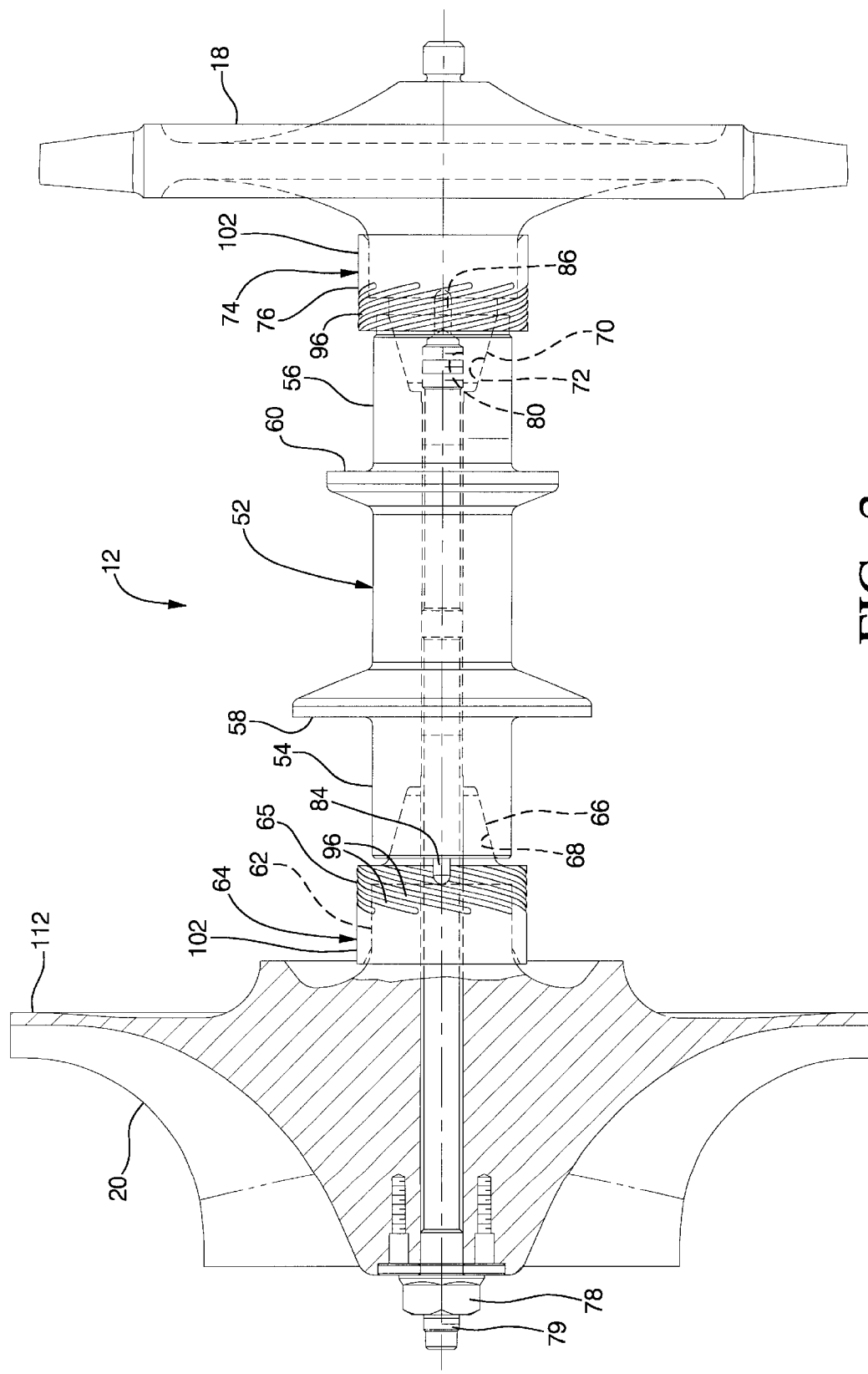
FIG. 2 is a side view of the rotor from the embodiment of FIG. 1 showing seal surfaces of the adapter and seal collar.

Referring particularly to FIG. 2, the rotor 12 includes a shaft 52 connected with the turbine wheel 18 at one end and the compressor wheel 20 at the opposite end. The shaft 52 includes a pair of axially spaced bearing journals 54, 56 respectively adjacent the compressor and turbine wheel ends of the shaft. A flange, inboard of journal 54, carries a radial thrust reaction surface 58. A second flange adjacent journal 56 carries a radial surface 60. Journals 54, 56 are respectively supported in bearings 48, 50. Radial surface 58 carries thrust forces to the sleeve/thrust bearing 58 and radial surface 60 limits axial movement of the rotor.

Connecting means of any suitable type may be provided for aligning and connecting the compressor and turbine wheels on their respective ends of the shaft 52. The aluminum alloy compressor wheel 20 includes an axially aligned cylindrical stub 62 on which is fixed an adapter 64 including an outer seal surface 65. For the compressor wheel 18, the connecting means comprise a pair of non-locking cones including an external cone 66 extending axially from the adapter 64 and engaging an internal cone 68 formed in the compressor end of the shaft 52.

For the turbine wheel 18, the connecting means include non-locking cones including an external cone 70 integral with and extending axially from the turbine wheel to engagement with an internal cone 72 formed in the turbine end of the shaft 52. A seal collar 74 fixed on the turbine wheel adjacent the cone 70 includes an outer seal surface 76. The rotor elements are secured together by fastener means including a nut 78 and a long stud 79 that extends through the compressor wheel 20 and shaft 52 to engage a threaded opening 80 in the external cone 70 of the turbine wheel 18. The stud and nut hold the non-locking cones in engagement to maintain the compressor and turbine wheels in axial alignment on the shaft 52. -Mechanical stops 84, 86 are preferably provided between the shaft and wheel elements of the rotor to provide angular orientation and allow reassembly of the elements in predetermined angular relation. Any suitable forms of stops may be used.

Figure 3:
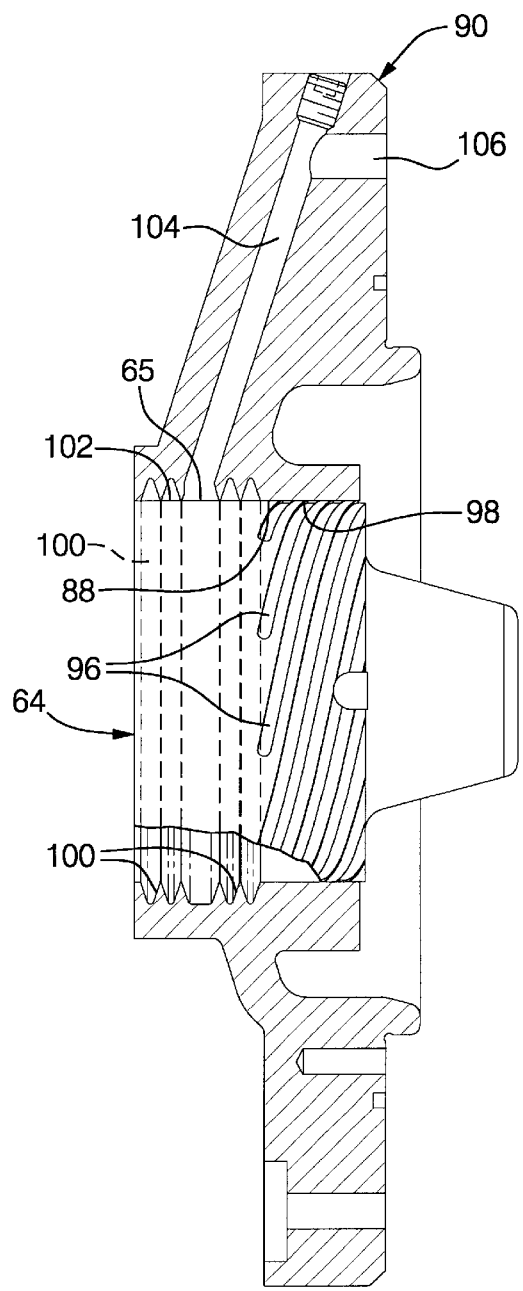
FIG. 3 is a cross-sectional view of the compressor seal assembly with portions of the adapter broken away to show the seal bore grooves.
Figure 4:
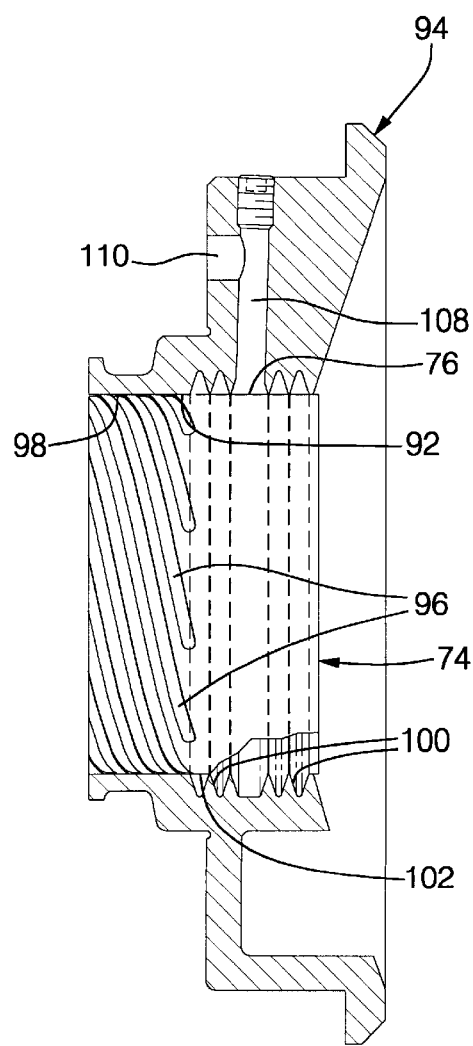
FIG. 4 is a cross-sectional view of the turbine seal assembly with portions of the seal collar broken away to show the seal bore grooves.

In accordance with the invention, as best shown in FIGS. 2–4, the outer seal surface 65 of adapter 64 is an outer cylinder located between the compressor wheel 20 and bearing journal 54, which is supported by oil lubricated bearing 48 (FIG. 1). The outer cylinder 65 is surrounded by an inner cylinder 88, formed by a bore in a compressor seal 90 fixed to the rotor support 14 at the compressor end of the support portion 46. Similarly, the outer seal surface 76 of seal collar 74 is an outer cylinder located between the turbine wheel 18 and bearing journal 56, which is supported by oil lubricated bearing 50. The outer cylinder 76 is surrounded by an inner cylinder 92, formed by a bore in a turbine seal 94 fixed to the rotor support 14 at the compressor end of the support portion 46. The outer cylinders 65, 76 are centered within the inner cylinders 88, 92 with a predetermined close clearance selected to enhance sealing action of the dual phase seals partially defined by opposing cylinders 65, 88 and 76, 92.

The outer cylinders 65, 76 are each provided with auger seal grooving 96 consisting of a multi-start helical thread cut into the outer cylinders 65, 76. The threads extend over about the inner halves of the respective outer cylinders, that is, the ends toward their adjacent bearings, and lie opposite smooth bore portions 98 of the associated inner cylinders 88, 92 (FIGS. 3 and 4). The threads have helix angles turning in opposite directions, chosen so that rotation of the rotor causes a viscous pumping action of the threads against the smooth bores 98 that forces oil entering the clearance back toward the associated bearings.

The inner cylinders 88, 92 are each provided with labyrinth seal grooving 100 (FIGS. 3 and 4) consisting of spaced circumferential lands and grooves cut into the inner cylinders 88, 92. The labyrinth seal grooving 100 extends over about the outer halves of the respective inner cylinders, that is, the ends toward their adjacent wheels 20, 18, and lies opposite smooth surfaced portions 102 of the associated outer cylinders 65, 76. A wider central groove in the grooving 100 receives air pressure through passages 104, 106 in the compressor seal 90 and passages 108, 110 in the turbine seal 94. The air pressure is received from an annular groove 112 in the turbocharger rotor support mounting portion 44 (FIG. 1) behind the back face 114 of the compressor wheel near its outer periphery. Air pressure is received at the groove 112 from the air output at the circumference of the compressor wheel and is conducted through internal passages in the rotor support 12 to the passages 106, 110 of the compressor and turbine seals 90, 94 for delivery to the labyrinth seal grooving 100. The air pressure in grooving 100 is distributed across the clearance from the smooth surfaced portions 102 of the outer cylinders 65, 76 and partially flows back through the clearance toward the adjacent bearings 48, 50, further preventing the passage of oil through the clearance toward the compressor and turbine wheels.

The turbocharger rotor operates over a relatively large speed range, in which it is beyond the ability of the auger seal grooving to be fully effective. Thus, the auger seal portion is made to provide effective oil sealing primarily in the lower portion of the rotor operating speed range and its effectiveness drops off in the higher portion of the speed range. Conversely, the air pressure fed to the annular groove 112 from the compressor wheel output is relatively low at low rotor speeds and inadequate to provide effective labyrinth oil sealing. However, in the higher portion of the rotor speed range the air pressure is adequate to provide effective sealing by the labyrinth seal portions.

Thus the combined auger seal grooving 96 and labyrinth seal grooving 100 together with pressure air supply thereto at higher turbine speeds comprise dual phase seals 116, 118 that provide effective oil sealing over the entire operating speed range of the turbocharger rotor 12. In the turbocharger application, the dual phase seals comprise part of a seal system 120 that supplies pressure air to the labyrinth seals from the output of the compressor wheel, wherein the pressure is reduced in a lower portion of the rotor speed range. In this lower speed portion, the auger seal grooves are fully effective to prevent oil leakage toward the wheels. At higher rotor speeds, higher air pressures supplied by the compressor wheel make the labyrinth seal portions fully effective to prevent oil leakage while the effectiveness of the auger seal portions is reduced. Since positive clearance is provided between the inner and outer cylinders of the dual phase seals, virtually no wear is experienced at the seal surfaces during operation of the turbocharger. Further, if some contact did occur, only minor wear would be experienced which would not impair the sealing functions. Additionally, the dual seal assembly includes no fragile components which can break and potentially damage the rotor. Thus the dual phase seal system provides a cost effective as well as functionally effective and reliable seal system for a turbocharger or other rotary machine wherein a variable air pressure source is available.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A dual phase seal for limiting oil leakage from a lubricated bearing of a rotor support to a gas reacting wheel of a rotor operational over an extended speed range, said seal comprising:

an outer cylinder on the rotor between the bearing and the wheel;

an inner cylinder carried by tile rotor Support and surrounding the outer cylinder with close clearance;

auger seal grooving formed in one of the cylinders a portion thereof toward the bearing, and the auger seal grooving comprising a multi-start helical thread cut in one of the cylinders;

labyrinth seal grooving formed in one of the cylinders on a portion thereof toward the wheel; and a pressure air supply for supplying air to the labyrinth seal grooving at a pressure which is reduced at rotor speeds in a lower portion of the rotor speed range.

2. A dual phase seal as in claim 1 wherein said wheel is an air compressing impeller.

3. A dual phase seal as in claim 1 wherein said wheel is an exhaust gas driven turbine.

4. A dual phase seal as in claim 1 wherein said air supply is an output of an air compressing impeller mounted on said rotor.

5. A dual phase seal as in claim 1 wherein said auger seal grooving is in the outer cylinder.

6. A dual phase seal as in claim 1 wherein said labyrinth seal grooving is in the inner cylinder.

7. A seal system for a turbocharger having an exhaust gas driven rotor including a turbine wheel connected by a shaft to a compressor wheel, the shaft being supported in a rotor support by spaced turbine and compressor end pressure lubricated bearings fixed respectively inwardly adjacent the turbine and compressor wheels for rotation of the rotor on an axis over an extended speed range, said seal system comprising an outer cylinder on the rotor between each of the wheels and their adjacent bearings;

an inner cylinder carried by the rotor support and surrounding each of the outer cylinders with close clearance;

auger seal grooving formed in one of the inner and outer cylinders adjacent each wheel on a portion of each of the respective cylinders toward its adjacent bearing;

labyrinth seal grooving formed in one of the inner and outer cylinders adjacent each wheel on a portion of each of the respective cylinders toward its adjacent wheel; and a pressure air supply from an output from the compressor wheel to supply air to the labyrinth seal grooving of each of the respective cylinders at a pressure which is reduced at rotor speeds in a lower portion of the rotor speed range;

said auger seal portions of the associated cylinders being effective to limit oil leakage toward their adjacent wheels in a lower portion of the rotor operational speed range when the air pressure output from the compressor wheel is low; and said labyrinth seal portions of the associated cylinders being effective to limit oil leakage toward their adjacent wheels in an upper portion of the rotor operational speed range when the air pressure output from the compressor wheel is increased and the effectiveness of the auger seal portions is reduced.

8. A seal system as in claim 7 wherein said auger seal grooving is in the outer cylinders.

9. A seal system as in claim 7 wherein said labyrinth seal grooving is in the inner cylinders.

10. A seal system as in claim 7 wherein said air supply output originates at a recess behind a back face of the compressor wheel.

* * * * *